US009962869B2

(12) United States Patent
Winget et al.

(10) Patent No.: US 9,962,869 B2
(45) Date of Patent: May 8, 2018

(54) AUTOMATED METHOD AND SYSTEM FOR MAKING PAINTED VEHICLE BODY PANEL SKINS AND VEHICLE BODY PANELS, SUCH AS INSTRUMENT PANELS, UTILIZING SAME

(71) Applicant: Global IP Holdings, LLC, Sterling Heights, MI (US)

(72) Inventors: Larry J. Winget, Leonard, MI (US); Darius J. Preisler, Macomb, MI (US); Jason T. Murar, Macomb, MI (US); William G. Krowl, Clinton Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 93 days.

(21) Appl. No.: 15/079,063

(22) Filed: Mar. 24, 2016

(65) Prior Publication Data

US 2016/0200016 A1 Jul. 14, 2016

Related U.S. Application Data

(63) Continuation of application No. 12/104,703, filed on Apr. 17, 2008, now abandoned.

(51) Int. Cl.
*B29C 44/12* (2006.01)
*B29C 44/08* (2006.01)
(Continued)

(52) U.S. Cl.
CPC ........ *B29C 44/1271* (2013.01); *B29C 44/086* (2013.01); *B29C 45/14811* (2013.01);
(Continued)

(58) Field of Classification Search
CPC .... B29C 44/12; B29C 45/14811; B29C 45/14
See application file for complete search history.

(56) References Cited

U.S. PATENT DOCUMENTS

| 5,276,957 A | 1/1994 | Murphy et al. |
| 6,071,619 A | 6/2000 | De Winter |
| (Continued) |

FOREIGN PATENT DOCUMENTS

WO  2007137623 A1  12/2007

OTHER PUBLICATIONS

Decision on Appeal; related U.S. Appl. No. 12/104,703; notification date Jan. 29, 2016.

*Primary Examiner* — Christopher T Schatz
*Assistant Examiner* — Cynthia L Schaller
(74) *Attorney, Agent, or Firm* — Brooks Kushman P.C.

(57) ABSTRACT

An automated method and system for making painted vehicle body panel skins and vehicle body panels. The method includes transferring a mold having a mold surface from an entrance station to a paint station within a dispensing area. The method further includes applying paint on the mold surface to form a layer of paint on the mold surface at the paint station. The method still further includes spraying curable polyurethane elastomer on the painted surface at a spray station within the dispensing area. The paint and spray stations may be coincident. The method still further includes, after the step of spraying and while the polyurethane elastomer is uncured, transferring the mold with the paint and the uncured polyurethane elastomer from the spray station to at least one accumulator station in a curing area to allow the polyurethane elastomer to completely cure in the mold and form the skin.

10 Claims, 4 Drawing Sheets

(51) Int. Cl.
  *B29C 45/14*   (2006.01)
  *B29K 75/00*   (2006.01)
  *B29K 105/04*  (2006.01)
  *B29L 31/30*   (2006.01)

(52) U.S. Cl.
  CPC   *B29C 2045/14532* (2013.01); *B29K 2075/00* (2013.01); *B29K 2105/04* (2013.01); *B29L 2031/3008* (2013.01); *B29L 2031/3041* (2013.01)

(56) References Cited

U.S. PATENT DOCUMENTS

| | | |
|---|---|---|
| 6,348,173 B1 | 2/2002 | Barnes |
| 6,428,718 B1 | 8/2002 | Winget et al. |
| 6,533,861 B1 | 3/2003 | Matsuda et al. |
| 6,620,371 B1 | 9/2003 | Winget et al. |
| 6,686,007 B2 | 2/2004 | Murphy |
| 6,875,390 B2 | 4/2005 | Cowelchuk |
| 6,877,972 B2 | 4/2005 | Lilienthal |
| 6,902,758 B2 | 6/2005 | Donatti et al. |
| 6,939,597 B2 | 9/2005 | Winget et al. |
| 6,991,841 B2 | 1/2006 | Cowelchuk et al. |
| 7,070,120 B2 | 7/2006 | Cowelchuk et al. |
| 7,101,505 B2 | 9/2006 | Winget et al. |
| 7,121,578 B2 | 10/2006 | Cowelchuk et al. |
| 7,147,808 B2 | 12/2006 | Cowelchuk et al. |
| 7,147,809 B2 | 12/2006 | Cowelchuk et al. |
| 7,195,725 B2 | 3/2007 | Adams et al. |
| 7,273,572 B2 | 9/2007 | Cowelchuk et al. |
| 7,291,301 B2 | 11/2007 | Cowelchuk et al. |
| 2002/0041964 A1 | 4/2002 | Winget et al. |
| 2002/0158371 A1 | 10/2002 | Winget et al. |
| 2002/0171181 A1 | 11/2002 | Winget et al. |
| 2004/0061262 A1 | 4/2004 | Cowelchuk |
| 2004/0132953 A1 | 7/2004 | Fieldhouse et al. |
| 2006/0006568 A1 | 1/2006 | Cowelchuk et al. |
| 2006/0008622 A1 | 1/2006 | Cowelchuk et al. |
| 2006/0029751 A1 | 2/2006 | Cowelchuk |
| 2006/0029789 A1 | 2/2006 | Donatti et al. |
| 2006/0091575 A1 | 5/2006 | Sroka et al. |
| 2006/0210662 A1 | 9/2006 | Winget et al. |
| 2006/0261578 A1 | 11/2006 | Cowelchuk et al. |
| 2007/0067994 A1 | 3/2007 | Cowelchuk |

AUTOMATED METHOD AND SYSTEM FOR MAKING PAINTED VEHICLE BODY PANEL SKINS AND VEHICLE BODY PANELS, SUCH AS INSTRUMENT PANELS, UTILIZING SAME

CROSS REFERENCE TO RELATED APPLICATION

This application is a Continuation of U.S. application Ser. No. 12/104,703 filed Apr. 17, 2008. Related U.S. Pat. No. 8,641,398 issued Feb. 4, 2014.

BACKGROUND OF THE INVENTION

1. Field of the Invention

This invention relates to methods and systems for making painted vehicle panel skins and panels utilizing same and, in particular, to automated methods and systems for making painted vehicle body panel skins and panels, such as instrument panels, utilizing same.

2. Background Art

A vehicle body panel may include a rigid substrate panel, a layer of padding material, and a vinyl skin. When the panel is an instrument panel, the substrate material often times includes an opening which registers with an air bag. A door panel is hinged within the opening and the vinyl material bridges across the opening and the door panel. The prior art is known to promote tearing of the vinyl upon deployment of the air bag by molding the vinyl to provide a reduced cross section thickness of the vinyl skin at the desired location of the tear seam. It has also been proposed to score the vinyl skin using a laser or other cutting technique to weaken the skin and thereby provide a tear seam.

Referring to FIG. 1 (which corresponds to FIG. 1 of U.S. Pat. No. 6,348,172), a motor vehicle instrument panel cover 10 is shown for installation in a motor vehicle body to conceal and enclose such components as the instrument cluster, radio, and heating ventilating and air conditioning systems. The instrument panel cover 10 has a hidden air bag door 12, the edges of the door being generally located behind the indentation 14 in the surface or cover 10.

FIG. 2 (which corresponds to FIG. 2 of U.S. Pat. No. 6,348,172) shows the instrument panel cover 10 of FIG. 1 installed in the vehicle. The instrument panel cover 10 includes a rigid molded plastic substrate 18, a layer of urethane foam 20 and a vinyl skin 22. The instrument panel cover 10 is manufactured by placing the pre-molded substrate 18 and the pre-molded vinyl skin 22 in a mold and then injecting urethane foam into space between the substrate 18 and vinyl skin 22. Alternatively, the skin 22 may be placed on one half of the mold, the substrate 18 placed on the other half of the mold, and then the uncured foam poured into the mold before the mold is closed. Upon curing, the urethane foam 20 adheres to both the substrate 18 and the vinyl skin 22 and provides a layer of cushioning therebetween. As seen in FIG. 2 the instrument panel cover 10 encloses an air conditioning duct 24 and an air bag assembly 26. Air bag assembly 26 includes a conventional inflator 28 and a folded up air bag 30. The substrate 18 of the instrument panel cover has a generally rectangular opening 32 defined in part by a top wall 34 and a bottom wall 36. This opening 32 of the substrate 18 registers with the air bag assembly 26. An air bag door panel 40, of stamped steel or molded plastic construction has a top edge 42 which is suitably hinged to the substrate member 18 adjacent to the top wall 32 of the air bag opening 40 by suitable hinges which are not shown in the drawing. The bottom edge of the door panel seats on a flange 43 of the substrate 18. The layer of urethane foam 20 adheres the vinyl skin 22 to the hinged door panel 40.

Upon actuation of the air bag inflator 28, the air bag 30 is deployed against the backside of the door panel 40, causing the air bag door 40 to hinge upwardly and thereby permit deployment of the air bag into the occupant compartment of the vehicle. It will be understood and appreciated that the upward hinging of the door panel 40 will require tearing of the vinyl skin 22 along the path of the tear seam indentation 14 shown in FIG. 1.

Referring to FIG. 2, the lower edge of the hidden tear seam indentation 14 is provided at a shoulder 44 of the vinyl skin 22. Referring to FIG. 1, it is seen that the right hand portion of the hidden tear seam 14 is provided at a shoulder 46 and the left hand portion of the hidden tear seam 14 is provided at a shoulder 48 which melds into the cutout 50 for an air conditioning vent, not shown.

U.S. Pat. No. 6,348,172 discloses a method of making a thermoplastic skin including the steps of providing a mold having a mold surface with first and second mold surface portions which intersect at a sharp corner coincident with the desired location of the tear seam in the molded skin. The mold is oriented with one of the first and second mold surface portions oriented in a generally horizontally orientation and the other of the mold surface portions oriented in a generally vertical orientation. A thermoplastic material such as polyurethane is sprayed onto the mold surface and the curing of the sprayed material is controlled to permit gravity to induce flow of the sprayed material down the vertical surface of the mold at the sharp corner and thereby provide a cured skin which is of significantly lessened thickness at the corner than at other regions of the skin. Accordingly, the reduced thickness of thermoplastic material at the sharp corner defines the tear seam at which the skin material will tear upon deployment of an air bag against the skin.

As described in U.S. Pat. No. 6,877,972, solid urethane elastomer material may be used as part of a process for forming parts in a mold. The solid urethane elastomer is a two-part composition that is mixed at a spray head before applying the material to a mold. The urethane elastomer is formulated to set-up relatively quickly. For example, the urethane elastomer is sprayed from the spray head as a liquid and begins to set-up in about 10 to 15 seconds after it contacts the mold. In about two minutes, the urethane elastomer is cohesive and its surface is tack-free. Even with this relatively rapid set-up, when the urethane elastomer is sprayed on a vertical surface, the elastomer forms drips or runs on the vertical surface and may accumulate in liquid pools where a vertical surface meets a horizontal surface. It is also difficult to obtain a surface coating having relatively uniform thickness if the urethane elastomer is sprayed on a vertical surface because gravity causes the material to flow. On a horizontal surface, the urethane elastomer is easily applied to form a uniform thickness after it contacts the horizontal surface.

Examples of automotive parts that may include a urethane elastomer skin include instrument panels, inner door panels, consoles, glove box doors, steering wheel covers, body pillar covers, and the like. An example of a process for forming automotive parts having a urethane elastomer skin is provided below. In an in-mold painting process utilizing an aromatic urethane, the process would begin by applying paint to a mold release agent in the mold for the part. After painting, the aromatic or aliphatic urethane elastomer is sprayed onto the paint layer to form a wall having a thickness of approximately 1/16 to 1/8 inch. However, if the part has surfaces that are not substantially horizontal, but are vertical or sloped, the urethane elastomer will form drips and pools and have areas of reduced thickness. After the urethane elastomer has solidified, an injection molded part may be inserted into the mold on top of the urethane elastomer skin. The injection molded part provides reinforcement ribs, frames for installation of components such as air bags or instruments, and fastener receptacles. Foam is then injected into the mold to fill the mold and secure the injected molded part to the urethane elastomer skin. The part may then be removed from the mold and trimmed.

Recent developments in the manufacture of vehicles include incorporation of a plurality of air bags in the vehicle interior. Parts such as inner trim panels for doors, instrument panels and steering wheel covers that may be formed by the above-described process must be formed with more uniform wall thickness to meet part specifications for air bag covers.

U.S. Pat. No. 6,877,972 seeks to solve the problem of drips and pools of urethane elastomer by providing a mold which is moved by a mold manipulation tool to present differently oriented surfaces of the mold in a horizontal orientation when the urethane elastomer is sprayed on each of the differently oriented surfaces. A multi-axis robot is provided with a spray head that sprays the urethane elastomer onto a mold surface. A mold manipulator moves the mold that has a plurality of differently oriented mold surfaces so that the surface to be sprayed is held in a horizontal orientation as they are coated with the urethane elastomer and for a predetermined time period after spray coating until the urethane elastomer sets up.

Other related U.S. patent documents include U.S. Pat. Nos. 6,071,619; 6,902,758; 6,875,390; 6,991,841; 7,070,120; 7,121,578; 7,147,808; 7,147,809; 7,195,725; 7,273,572; 7,291,301; 2004/0061262; 2006/0091575; 2006/0006568; 2006/0008622; 2006/0029789; 2006/0261578 and 2007/0067994.

Despite all of the above-noted background art, there is still a need for a low cost, faster (i.e., greater throughput) yet simpler method and system for making vehicle body panel skins and body panels utilizing same while maintaining a soft and luxurious look and feel for the article.

Additional relevant art includes: U.S. Pat. Nos. 5,276,957; 6,428,718; 6,620,371; 6,686,007; 6,939,597 and 7,101,505; and U.S. published applications 2002/0041964; 2002/0158371; 2002/0171181 and 2006/0210662.

SUMMARY OF THE INVENTION

An object of at least one aspect of the present invention is to provide an improved automated method and system for making vehicle body panel skins and body panels, such as instrument panels, utilizing same, wherein throughput and equipment utilization are greatly improved at a relatively low cost.

In carrying out the above object and other objects of the present invention, a method of making a painted vehicle body panel skin is provided. The method includes transferring a mold having a mold surface from an entrance station to a paint station within a dispensing area. The method further includes applying paint on the mold surface to form a layer of paint on the mold surface at the paint station. The method still further includes spraying curable polyurethane elastomer on the painted surface at a spray station within the dispensing area. The method still further includes, after the step of spraying and while the polyurethane elastomer is uncured, transferring the mold with the paint and the uncured polyurethane elastomer from the spray station to at least one accumulator station in a curing area to allow the polyurethane elastomer to completely cure in the mold and form the skin.

The step of transferring the mold from the spray station to the curing area may allow another mold to be transferred to the dispensing area from the entrance station.

Each of the paint, spray and accumulator stations may have an enclosed chamber and the method may further include pressurizing each of the paint, spray and accumulator chambers at subatmospheric pressure.

The paint station may be coincident with the spray station.

The method may further include the steps of transferring the mold with the completely cured polyurethane elastomer from the at least one accumulator station to an unload station and unloading the skin from the mold at the unload station.

The unload station may be coincident with the entrance station.

The method may further include transferring the mold to the entrance station prior to the step of transferring the mold to the paint station. The entrance station may have an enclosed chamber. The method may further include pressurizing the entrance chamber at subatmospheric pressure.

The method may further include cleaning the mold surface after the skin has been unloaded from the mold at the unload station and before the paint is applied on the mold surface.

The method may further include applying a release agent to the mold surface after the skin has been unloaded from the mold at the unload station and before the paint is applied on the mold surface.

The mold may be transferred along a loop-shaped guide path. Each of the stations may be located along the guide path.

The mold may be transferred along a guide path between the stations by a transport mechanism disposed within each of the enclosed chambers.

The step of spraying may include the step of automatically moving a polyurethane sprayer through a predetermined polyurethane spray path relative to at least two control axes while spraying the polyurethane elastomer on the painted surface.

The method may further include the step of automatically controlling the polyurethane elastomer so that the flow of polyurethane elastomer on the painted surface is controlled.

The step of transferring the mold from the entrance station may include the step of transferring the mold into the work envelope of a paint sprayer within the paint station.

The step of applying may include the step of automatically moving the paint sprayer through a predetermined paint spray path relative to at least two control axes while spraying the paint on the mold surface.

The method may further include the step of automatically controlling the paint sprayer so that the flow of paint on the mold surface is controlled.

The method may further include the step of transferring the mold into the work envelope of a polyurethane sprayer at the spray station.

A method of making a vehicle body panel may include the steps for making the skin and inserting the unloaded skin into a plastic injection mold. The method may further include injecting molten plastic into the injection mold to at least partially cover a surface of the skin opposite the paint. The method may still further include allowing the molten plastic to cool and bond with the skin to form the vehicle body panel.

A method of making a vehicle body panel may include the steps for making the skin and inserting the unloaded skin and a corresponding injection molded part into a foam mold. The method may further include holding the skin and the part within the foam mold so a space is formed between the skin and the part. The method may still further include injecting foam into the space between the skin and the part. The method may still further include allowing the foam to cure thereby bonding the skin to the part with the cured foam therebetween to thereby form the vehicle body panel.

Further in carrying out the above object and other objects of at least one aspect of the present invention, a system for making painted vehicle body panel skins is provided. The system includes an entrance station. The system further includes a paint station within a dispensing area wherein paint is applied on mold surfaces of molds to form a layer of paint on each mold surface at the paint station. The system still further includes a spray station within the dispensing area. The spray station includes a program-controlled manipulator having a work envelope and an automatic sprayer supported on the manipulator for movement relative to at least two control axes for spraying curable polyurethane elastomer therefrom on the painted surfaces of the molds. The system still further includes at least one accumulator station in a curing area to allow the curable polyurethane elastomer to completely cure in the molds to form the skins. The system still further includes an unload station at which the skins are unloaded from the molds. Each of the stations is located along a guide path. The system still further includes a transport mechanism for transporting the molds. The transport mechanism conveys the molds along the guide path and stops and maintains each of the molds in a stationary predetermined position relative to the guide path during painting, spraying and unloading functions performed in the paint, spray, and unload stations, respectively. The system still further includes a control system for causing the manipulator to move the sprayer through a predetermined spray path relative to the at least two control axes, for controlling the sprayer so that the flow of the polyurethane elastomer on the painted surface is controlled and for causing the transport mechanism to move the molds to each of the different stations along the guide path. After each skin is unloaded from its corresponding mold in the unload station the corresponding empty mold is maintained in a stationary predetermined position in the entrance station.

The transport mechanism may include a plurality of pallets. Each of the pallets receives and retains a mold thereon.

The unload station may be coincident with the entrance station and the guide path is loop-shaped.

Each of the paint, spray and accumulator stations may have an enclosed chamber. The system may further include blower means for pressurizing each of the chambers with an ambient at subatmospheric pressure.

Each of the entrance, paint, spray, accumulator and unload stations may have an enclosed chamber. The system may further include blower means for pressurizing each of the enclosed chambers with an ambient at subatmospheric pressure.

The paint station may be coincident with the spray system.

The manipulator may also apply paint to the mold surfaces of the molds at the paint station.

The transport mechanism may also include a transfer mechanism disposed within each of the enclosed chambers for conveying the pallets along the guide path.

A system for making vehicle body panels may include the system for making the skin and a plastic injection mold for receiving and retaining an unloaded skin. The mold may also receive molten plastic which at least partially covers a surface of the skin opposite the paint and allow the molten plastic to cool and bond with the skin to form the vehicle body panel within the mold.

A system for making vehicle body panels may include the system for making the skin and a foam mold for receiving and retaining an unloaded skin and a corresponding injection molded part in spaced relationship in the foam mold to form a space between the skin and the part. The foam mold may also receive foam into the space between the skin and the part and allow the foam to cure thereby bonding the skin to the part with the cured foam therebetween to thereby form the vehicle body panel within the foam mold.

The advantages accruing to the method and system of at least one embodiment of the present invention are numerous. For example, the system uses a relatively small amount of factory floor space despite having a high throughput. The method and system efficiently utilize automated equipment. Also, fumes from the polyurethane elastomer (and paint) are effectively exhausted and not allowed to escape at the stations.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 3:
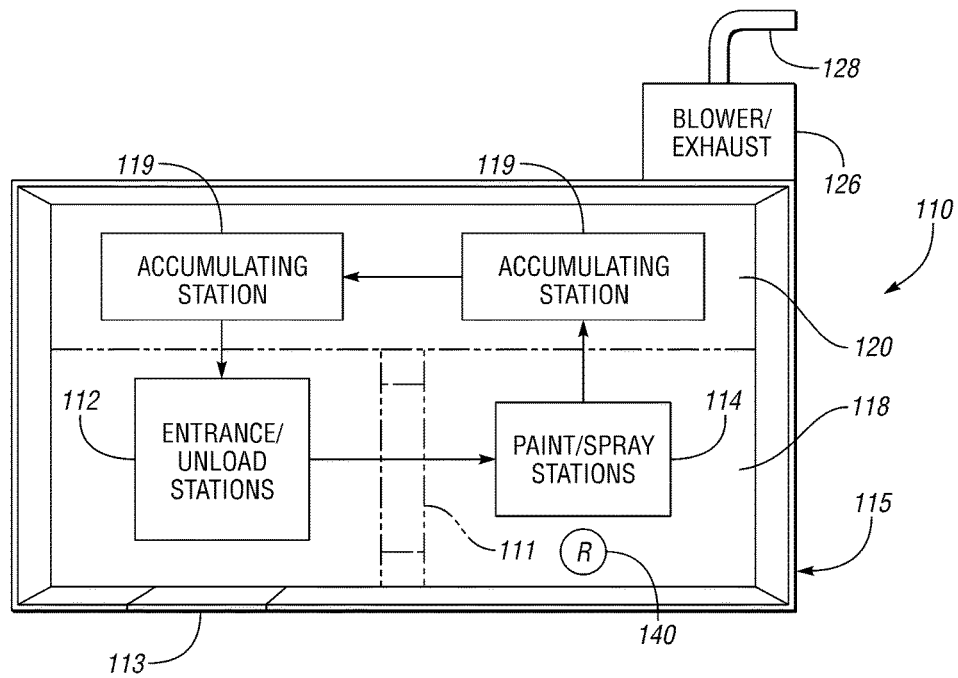
FIG. 3 is a schematic view of a system (with its top removed) constructed in accordance with one embodiment of the present invention with the flow or transport of molds between stations indicated by arrows.

Referring now to the drawing figures, there is illustrated in FIG. 3 a system, generally indicated at 110, for making a series of painted vehicle body panel skins along a loop-shaped guide path in a manufacturing area and constructed in accordance with one embodiment of the present invention. The system 110 also performs one embodiment of the method of the present invention.

Figure 1:
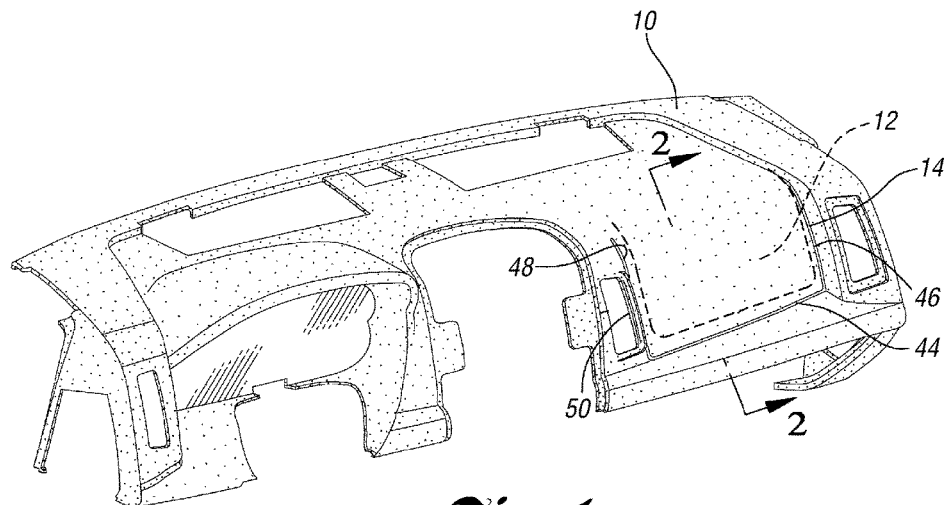
FIG. 1 is a perspective view of a prior art molded vinyl skin for covering a rigid substrate panel and a layer of padding.
Figure 2:
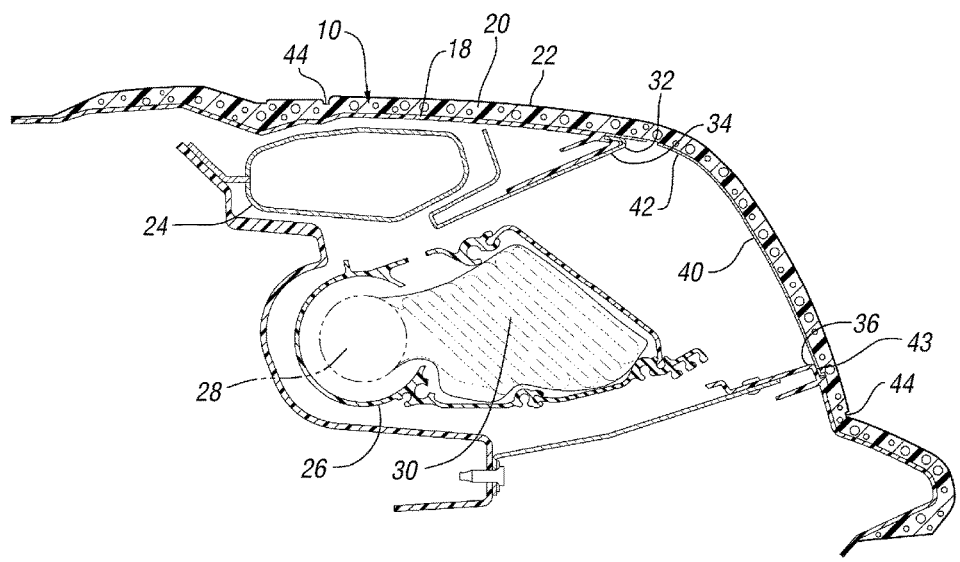
FIG. 2 is a sectional view taken along lines 2-2 of FIG. 1 which shows an air bag assembly installed behind an instrument panel cover, which includes a rigid substrate panel, a layer of padding, and the vinyl skin of FIG. 1.
Figure 7A:
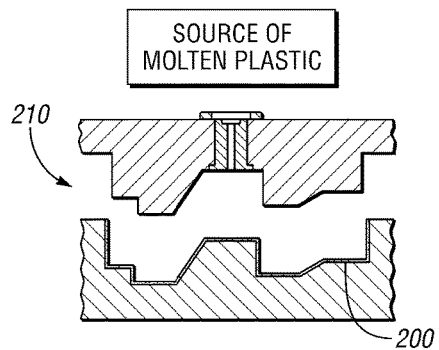
FIGS. 7a-7c are views, partially broken away and in cross section, of a plastic injection mold and illustrating method steps for forming a vehicle body panel as shown, partially broken away in cross section, in FIG. 7d.
Figure 7B:
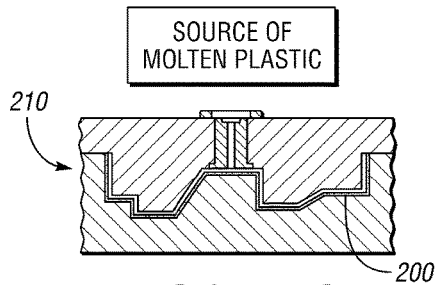
Figure 7C:
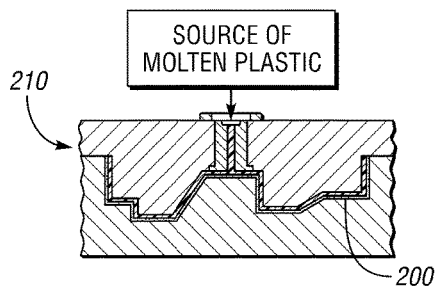
Figure 8C:
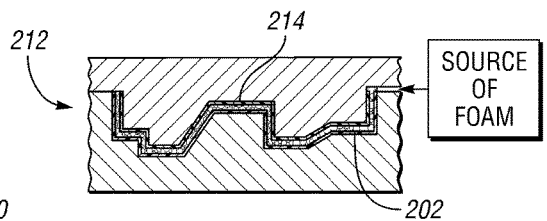
Figure 7D:
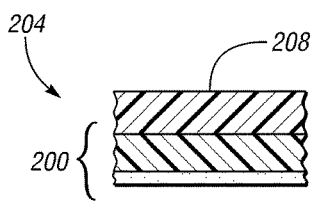
Figure 8D:
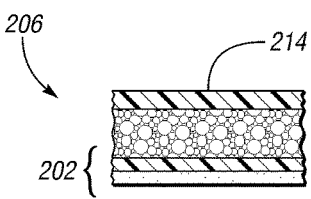

In the embodiment of the invention described herein, the system 110 is utilized to make painted vehicle body panel skins (two of which are shown in FIGS. 7d and 8d at 200 and 202, respectively) for use with vehicle body panels (two of which are generally indicated in FIGS. 7d and 8d at 204 and 206, respectively), such as an instrument panel. The skins 200 and 202, as well as the resulting panels 204 and 206, respectively, have a soft and luxurious look and feel. The skin 200 or 202 may be similar in overall appearance to the skin 22 of FIGS. 1 and 2.

In general, initially a first material such as polyurethane paint, and then a second material such as a liquid polyurethane elastomer are sprayed onto a surface 147 of an open mold 145 (FIG. 4) which has been transferred by a transport mechanism into paint/spray stations 114 (FIG. 3). The open mold 145 is originally transferred from an unload station to an entrance station which are preferably coincident (hence "entrance/unload stations" in block 112). However, it is to be understood that the entrance/unload stations 112 may be spaced apart from one another. When the mold 145 is transferred from the entrance/unload stations 112 into paint/spray stations 114 within a dispensing area 118, the inner surface 147 of the mold 145 is initially painted at a paint station which is preferably coincident with the spray station (hence "paint/spray stations" in block 114). Then, the painted inner surface 147 is sprayed with polyurethane elastomer at the spray station. However, it is to be understood that the paint/spray stations 114 may be spaced apart from one another.

Then, the mold 145 is transferred into one or more accumulating stations 119 within a curing area 120. After the polyurethane elastomer has cured at the one or more accumulating stations 119 within the curing area 120, the cured skin is typically removed from the mold 145 at the unload station, which, as previously mentioned, is preferably coincident with the entrance station. The skin is typically placed into either a plastic injection mold 210 for bonding molten plastic to form a substrate 208 for a panel 204 or placed into a foam mold 212 containing an injection molded part 214 (i.e., FIGS. 7a-7c and FIGS. 8a-8c, respectively). Foam is injected into and fills the mold 212 to secure the injection molded part 214 to the skin 202 thereby forming the panel 206.

The system 110 is especially designed so as to take up a minimum amount of floor space (i.e. has a small footprint) while making such skins in a production environment at a high throughput while efficiently using the production equipment of the system 110.

The system 110 may include framework or framing which includes a plurality of beams (one of the horizontal beams is shown at 116 in FIG. 4), all interconnected together such as by welds and gaskets. The framework is completely enclosed within a structure, generally indicated at 115 in FIG. 3 (but with its top removed), which may be made up of a plurality of interconnected plexiglass panels which are supported above and about the framework by spacers and brackets (not shown).

A blower or exhaust 126 is preferably located at or near the top of the plexiglass structure 115 and provides a partial vacuum within the plexiglass structure 115 at each of the stations 112, 114, and 119 therein in order to evacuate fumes from the paint and polyurethane elastomer which form the skins. A conduit 128 extending from the blower 126 may dispense the fumes outside of the building in which the system 110 is located or may dispense the fumes into a filter system. Air is drawn into the plexiglass structure 115 at the lower end of the plexiglass structure 120.

Figure 4:
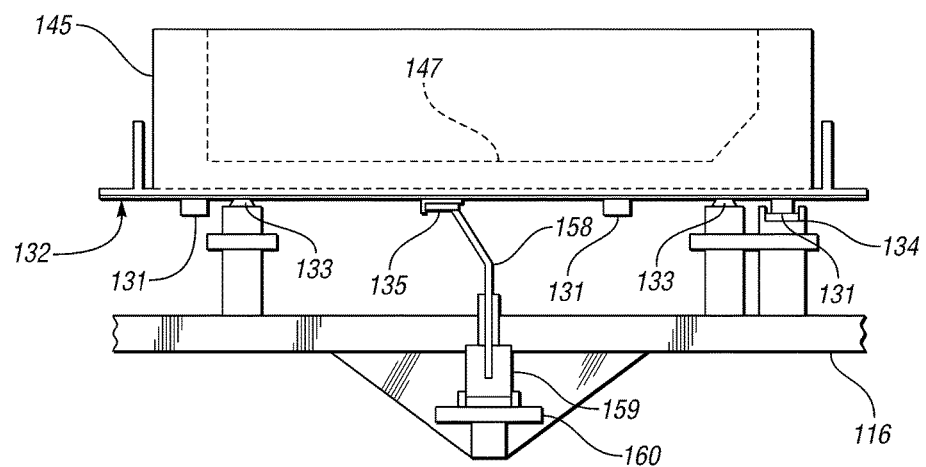
FIG. 4 is a side elevational view, partially broken away, illustrating one of various possible drive mechanisms for transferring molds horizontally between the stations of the system of FIG. 3.

Referring now to FIG. 3 in combination with FIG. 4, the entrance station of the stations 112 is provided adjacent the dispensing area 118 and may receive and retain a mold support fixture or pallet 132 in a predetermined position. In turn, each pallet 132 is adapted to receive and retain one of the molds 145 thereon for conveying the molds along the loop-shaped guide path. Preferably, the pallet 132 is made of a lightweight material, such as aluminum. The pallet 132 has downwardly extending projections or followers 131 which ride in guide tracks 134 (only one of which is shown in FIG. 4). The lower surface of the pallet 132 rides upon supported roller balls 133 between stations. The pallet 132 also includes a downwardly extending member 135 which is engaged by brackets, such as a bracket 158, mounted on various air cylinders to move the pallet 132 in a linear fashion.

Alternatively, the mold 145 itself may serve as its own pallet if properly modified to include the structures of the pallet 132 at its bottom surface to enable the mold 145 to be moved between the stations 112, 114 and 119 and then held with the stations 112, 114 and 119 as previously described.

Yet, still alternatively, a different transport mechanism may be utilized to transport the molds 145 between the stations 112, 114 and 119. The transport mechanism may take the form of a rotary table that can index the molds supported thereon between the stations 112, 114 and 119 and hold the molds in the stations 112, 114 and 119.

A movable door, indicated by solid lines at 113 in FIG. 3, also made of plexiglass, may be raised to allow a human or robotic operator to perform the following tasks: 1) remove a cured skin from the mold 145 at the entrance/unload stations 112; 2) clean the emptied mold 145, if necessary; and 3) apply a release agent to the inner surfaces 147 of the mold 145, if necessary.

Figure 5:
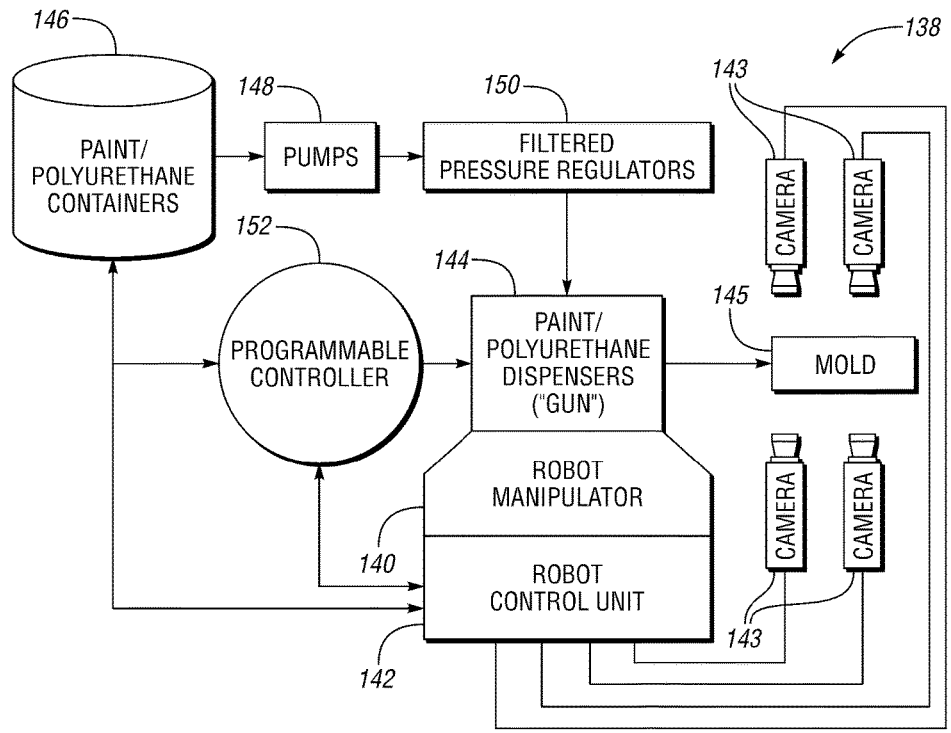
FIG. 5 is a schematic diagram of a robotic paint/polyurethane elastomer dispensing subsystem.

After the door 113 is subsequently lowered, another door, indicated by phantom lines 111 separating the stations 112 from the dispensing area 118, is raised and the pallet 132 (and supported mold 145) is then moved along the guide track 134 into the paint/spray stations 114 in the dispensing area 118. The door 111 is lowered and initially paint, such as polyurethane paint, is dispensed or applied on the inner surfaces 147 of the mold 145 such as by a robot or manipulator 140 of a dispensing system, generally indicated at 138 in FIG. 5. The details of such a robot dispensing system 138 are illustrated in FIG. 5. The system 138 is illustrated for spraying both paint and polyurethane elastomer (hence "paint/polyurethane containers" of block 146; "pumps" of block 148; "filtered pressure regulators" of block 150 and "paint/polyurethane dispensers" of block 144).

Alternatively, the paint can be applied to the inner surface 147 of the mold 145 by a human operator. In that event, typically the stations 114 would be separated and a door similar to the door 113 would be provided to allow the operator to access the inner surfaces 147 of the mold 145 in the dispensing area 118.

The robot or manipulator 140 operates under control of a robot control unit 142. The robot manipulator 140 has a work envelope and, alternately, either an automatic paint or polyurethane elastomer spray gun or dispenser 144 may be supported on the manipulator 140 for movement relative to at least two control axes for initially dispensing the paint and then the polyurethane elastomer, respectively, on the inner mold surfaces 147 at the paint/spray station 114, respectively.

Typically, initially the robot 140 automatically has the paint dispenser supported thereon. Then, after paint application, the robot 140 removes the paint dispenser and secures the polyurethane elastomer dispenser thereon. After the polyurethane elastomer is sprayed on the painted surface 147, then the robot 140 removes the polyurethane elastomer dispenser and replaces it with the paint dispenser in anticipation of painting a new unpainted surface 147 of a new mold 145 at the paint station.

A plurality of video cameras 143 can be spaced apart and are located at the paint/spray stations 114 to collect image data for use by the robot control unit 142 to determine not only the position and attitude of the mold 145 but also whether the paint and/or the polyurethane elastomer is being properly applied on the inner surfaces 147 of the mold 145. In this way, the movement of the robot manipulator 140 is accurately controlled.

The dispensers 144 for the paint and polyurethane are typically alternatively attached to a wrist of the robot manipulator 140 together with inlet hoses for paint, polyurethane elastomer and cleaning solvent. The dispensers 144 may be stored in a rack accessible to the robot 140 in the dispenser area 118 when not in use. The robot 140 can typically attach or unattach the dispensers 144 in an automatic fashion without human intervention.

When a mixing unit is used, such as for two-component polyurethane elastomers, the combined weight of the particular dispenser 144, the mixer unit and multiple hoses may necessitate the mounting of these on the arm of the robot manipulator 140.

The system 138 also includes paint/polyurethane containers 146, pumps 148 for pumping the paint and polyurethane from their respective containers 146, to their respective filtered pressure regulators 150 and to their respective dispensers 144.

Pump selection depends on the properties of the paint/polyurethane, size of the containers 146 and the dispensing rate required. The system 138 should keep track of the level of the paint/polyurethane in the containers 146 by means of a programmable controller 152 and stop the automatic operation of the paint/polyurethane dispensers 144 when the paint/polyurethane is depleted.

Because certain paints/polyurethanes dry out, harden or solidify if not mixed or if left unused for a period of time, the system 138 typically has the capability of automatically purging spoiled material and cleaning the containers 146 and the lines which run between the components of the system 138.

The programmable controller 152 is generally used to supervise the overall dispensing of the paint and the polyurethane elastomer and enables communication between the robot manipulator 140, the containers 146 and the dispensers 144. Typically, the programmable controller 152 is in communication with the robot control unit 142 to control the actuation of the dispensers 144 in coordination with the robot motion and for control of the level of the paint and the polyurethane in the containers 146.

Alternatively, an additional robot may be provided so that one robot applies the paint and the other robot applies the polyurethane elastomer. If two robots are used, then typically two robot control units are needed.

Yet, still alternatively, instead of one or more robots, one or more hard automations subsystems may be used to apply the paint and the polyurethane elastomer. In this case, robot control units are not used.

Each pallet 132 is pushed (or pulled) into the paint/spray stations 114 in the area 118 by an air cylinder (FIG. 6) which drives a driver or bracket 158 upon extension of its push rod 159, as generally indicated in FIGS. 3 and 4. The bracket 158 engages the member 135 on the lower surface of the pallet 132. The bracket 158 is guided in its movement by a guide rod 160.

Once the pallet 132 is in the paint/spray stations 114 (as sensed by the limit switches of FIG. 6), shot pins actuated by air cylinders (FIG. 6) together with a bracket actuated by another air cylinder lock the pallet 132 in a known predetermined position prior to the dispensing of the paint and then the polyurethane by the system 138. After both the paint and then the polyurethane are dispensed, the shot pins and the bracket are retracted by their respective air cylinders.

The mold 145 (the inner surface 147 of which is coated with the paint and then the polyurethane elastomer) is then moved into the one or more accumulator stations 119 in the curing area 118 from the paint/spray station 114 by means of one of the air cylinders which causes a bracket attached thereto to pull (or push) the pallet 132 into the adjacent accumulator station 119. The bracket is guided along a guide rod during movement of the bracket.

While two accumulator stations 119 are shown in FIG. 3, one or more than two accumulator stations 119 may be provided in the curing area to increase throughput of the system 110 while maximizing utilization of the robot 140. The pallet 132 stays in one or both of the accumulator stations 119 within the curing area 120 until the polyurethane elastomer in the mold 145 has completely cured.

Figure 6:
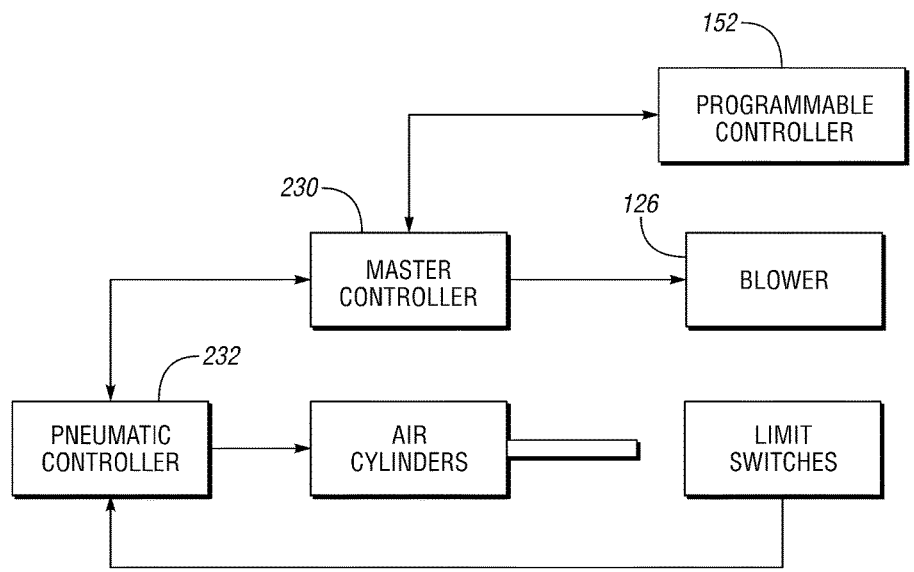
FIG. 6 is a schematic block diagram of an overall control system for the system of FIG. 3.
Figure 8A:
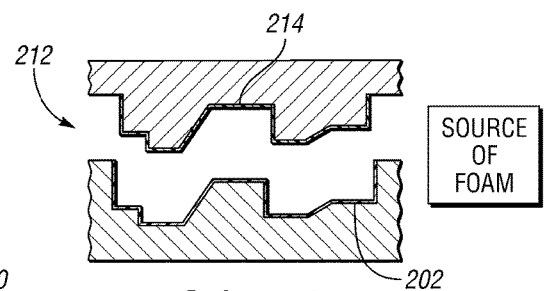
FIGS. 8a-8c are views, partially broken away and in cross section, of a foam mold and illustrating method steps for forming a vehicle body panel as shown, partially broken away and in cross section, in FIG. 8d.
Figure 8B:
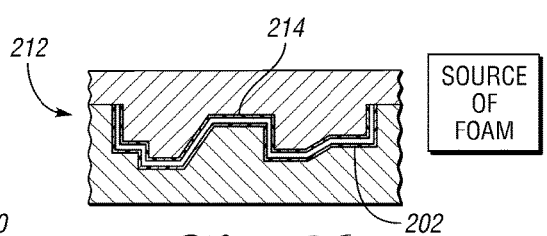

Between the accumulator stations 119, the pallets 132 are transferred or indexed horizontally. Once in the accumulator stations 119, the pallet 132 engages stop and limit switches (FIG. 6). The limit switches also signal the other air cylinders to push or pull the pallets 132 currently in the entrance/unload and paint/spray stations 112 and 114, respectively, into their next successive stations. A pallet 132 in the accumulator station 119 adjacent the entrance/unload stations 112 is pulled (or pushed) by an air cylinder through a bracket attached thereto into the entrance/unload stations 112. The bracket is guided in its movements along a guide rod.

When the pallet 132 supporting the mold 145 containing the completely cured skin has moved from the accumulator station 119 adjacent to the entrance/unload stations 112, the polyurethane is completely cured. The operator raises the door 113 and then removes the skin from the mold 145. Consequently, the entrance station also serves as an unload station. While the door 113 is still open, the operator may clean the mold 145, if necessary, and/or place more release agent on the mold surface 147, if necessary.

Referring now to FIG. 6, there is illustrated the overall control system for controlling the operation of the method and system of one embodiment of the present invention. A master controller 230 controls the programmable controller 152, the pneumatic controller 232 and the blower 126. The pneumatic controller 232 communicates with the master controller 230 to control actuation of the air cylinders as previously described. The limit switches, as also previously described, provide feedback signals to the pneumatic controller 232 which, in turn, provides actuating signals to the air cylinders as well as signals to the master controller 230 to control the blower 126 and the programmable controller 152, as previously described with reference to FIG. 5.

Referring again to FIGS. 7a-7c, there is illustrated the sequence of steps to make the body panel 204 of FIG. 7d from the skin 200. With the mold 210 open in FIG. 7a, the skin 200 is placed on the inner surface of the lower mold half. Then the mold 210 is closed in FIG. 7b. In FIG. 7c, molten plastic is injected into the mold 210 between the skin 200 and the lower surface of the upper mold half. After cooling, the mold 210 is opened and the resulting body panel 204 including the newly formed thermoplastic substrate 208 is removed from the mold 210. A view, partially broken away and in cross section, of the resulting panel 204 is shown in FIG. 7d.

Referring again to FIGS. 8a-8c, there is illustrated the sequence of steps to make the body panel 206 from a thermoplastic substrate 214 and the skin 202 (which is substantially identical to the skin 200). With the mold 212 open in FIG. 8a, the skin 202 is placed on the inner surface of the lower mold half. The injection molded substrate 214 is received and retained on the inner surface of the upper mold half. Then the mold 212 is closed in FIG. 8b. In FIG. 8c, molten foam is poured or injected in the space between the skin 202 and the plastic substrate 214. After the foam has cured, thereby bonding the skin 202 to the substrate 214, the resulting body panel 206 is removed from the opened mold 212. FIG. 8d is a view, partially broken away and in cross section, of the resulting panel 206.

While the best mode for carrying out the invention has been described in detail, those familiar with the art to which this invention relates will recognize various alternative designs and embodiments for practicing the invention as defined by the following claims.

What is claimed is:

1. A method of making painted vehicle body panel skins, the method comprising:
    providing an entrance station;
    providing a paint station within a dispensing area, and applying paint onto mold surfaces of molds to form a layer of paint on each mold surface at the paint station;
    providing a spray station within the dispensing area and within a first chamber, the spray station including a program-controlled manipulator having a work envelope and an automatic sprayer supported on the manipulator for movement relative to at least two control axes,
    spraying curable polyurethane elastomer on the painted surfaces of the molds to form a layer of elastomer on each layer of paint;
    providing a plurality of accumulator stations adjacent to and separate from the spray station and within a second chamber spaced apart from the first chamber in a curing area,
    exposing an entire surface of each layer of elastomer opposite the paint to ambient air,
    allowing the curable polyurethane elastomer to completely cure in the molds to form the skins in the accumulator stations, and receiving the molds in the accumulator stations during the curing of the polyurethane elastomer;
    providing an unload station wherein the skins are unloaded from the molds at the unload station and wherein each of the paint, spray, accumulator, and unload stations is located along a guide path;
    providing a transport mechanism for transporting the molds, the mechanism conveying the molds along the guide path and stopping and maintaining each of the molds in a stationary predetermined position relative to the guide path during painting, spraying and unloading functions performed in the paint, spray, and unload stations, respectively; and
    providing a control system under control of which (i) the manipulator moves the sprayer through a predetermined spray path relative to the at least two control axes, (ii) a flow of the polyurethane elastomer on each painted surface is controlled, (iii) the transport mechanism moves an uncured mold from the spray station along the guide path and to the accumulator stations for curing after spraying in the spray station and after transporting of the molds from the spray station into the accumulator stations by the transport mechanism, and (iv) the transport mechanism moves the molds between each of the paint, spray, accumulator, unload stations along the guide path, wherein, after each skin is unloaded from its corresponding mold in the unload station, the corresponding empty mold is maintained in a stationary predetermined position in the entrance station.

2. The method as claimed in claim 1, wherein the transport mechanism includes a plurality of pallets, each of the pallets receiving and returning one of the molds thereon.

3. The method as claimed in claim 1, wherein the unload station is coincident with the entrance station and the guide path is loop-shaped.

4. The method as claimed in claim 1, wherein each of the paint, spray and accumulator stations has an enclosed chamber, and the method includes the further step of pressurizing each of the chambers with the ambient air at subatmospheric pressure to exhaust fumes from the polyurethane elastomer and not allow the fumes to escape at each of the paint, spray and accumulator stations.

5. The method as claimed in claim 1, wherein each of the entrance, paint, spray, accumulator and unload stations has an enclosed chamber, and the method includes the further step of pressurizing each of the enclosed chambers with the ambient air at subatmospheric pressure to exhaust fumes from the polyurethane elastomer and not allow the fumes to escape at each of the entrance, paint, spray, accumulator and unload stations.

6. The method as claimed in claim 1, wherein the paint station is coincident with the spray system.

7. The method as claimed in claim 1, wherein the manipulator also applies paint to the mold surfaces of the molds at the paint station.

8. The method as claimed in claim 5, wherein the method includes the further step of conveying the pallets along the guide path via a transfer mechanism of the transport mechanism disposed within each of the enclosed chambers.

9. The method as claimed in claim 1 and further comprising the steps of: receiving and retaining an unloaded skin in a plastic injection mold, providing molten plastic to at least partially cover a surface of the unloaded skin opposite the paint, and allowing the molten plastic to cool and bond with the unloaded skin to form the vehicle body panel skin within the injection mold.

10. The method as claimed in claim 1 and further comprising the steps of:
    receiving and retaining an unloaded skin and a corresponding injection molded part in spaced relationship in a foam mold with a space between the unloaded skin and the part, providing foam into the space between the unloaded skin and the part, and allowing the foam to cure, thereby bonding the unloaded skin to the part with the cured foam therebetween to form the vehicle body panel skin within the foam mold.

* * * * *